US008688115B2

(12) United States Patent
Mildh et al.

(10) Patent No.: US 8,688,115 B2
(45) Date of Patent: Apr. 1, 2014

(54) ACCESS CONTROL ACCORDING TO A POLICY DEFINED FOR A GROUP OF ASSOCIATED ELECTRONIC DEVICES COMPRISING A CELLULAR MODEM

(75) Inventors: Gunnar Mildh, Sollentuna (SE); György Miklós, Pilisborosjenö (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/510,444

(22) PCT Filed: Nov. 23, 2009

(86) PCT No.: PCT/EP2009/065671
§ 371 (c)(1),
(2), (4) Date: Jun. 25, 2012

(87) PCT Pub. No.: WO2011/060837
PCT Pub. Date: May 26, 2011

(65) Prior Publication Data
US 2012/0258740 A1    Oct. 11, 2012

(51) Int. Cl.
*H04W 4/00* (2009.01)
*H04W 72/00* (2009.01)
*H04W 24/00* (2009.01)
*H04M 1/66* (2006.01)

(52) U.S. Cl.
USPC ............ 455/435.1; 455/434; 455/452.2; 455/456.4; 455/411

(58) Field of Classification Search
USPC ......... 455/410, 411, 435.1, 450, 451, 452.1, 455/434, 452.2, 456.1, 456.4
See application file for complete search history.

(56) References Cited

U.S. PATENT DOCUMENTS

| 7,769,389 | B1 * | 8/2010 | Mangal et al. ............. 455/452.1 |
| 2001/0023187 | A1 | 9/2001 | Wilhelm |
| 2004/0066926 | A1 | 4/2004 | Brockbank et al. |
| 2006/0285649 | A1 * | 12/2006 | Qian et al. ................. 379/32.01 |
| 2007/0099609 | A1 * | 5/2007 | Cai ............................. 455/428 |
| 2007/0218840 | A1 * | 9/2007 | Gerlach et al. ............. 455/63.2 |
| 2011/0028129 | A1 * | 2/2011 | Hutchison et al. ......... 455/414.1 |
| 2011/0158194 | A1 * | 6/2011 | Musikka et al. ............. 370/329 |

FOREIGN PATENT DOCUMENTS

| EP | 1571867 A2 | 9/2005 |
| JP | H09191342 A | 7/1997 |
| JP | 2007036672 A | 2/2007 |
| JP | 2007208334 A | 8/2007 |
| JP | 2008182469 A | 8/2008 |
| WO | 9901998 A1 | 1/1999 |

* cited by examiner

*Primary Examiner* — Christopher M Brandt
(74) *Attorney, Agent, or Firm* — Coats and Bennett PLLC

(57) ABSTRACT

Access control according to a policy defined for a plurality of electronic devices comprising a cellular modem and associated with the same user If an end user has two electronic devices, such as a fire alarm or an electricity meter, which both have a cellular modem and are allowed to operate in parallel under the same subscription, the end user can abuse this subscription by lending or selling one of the devices to another person. This abuse can be prevented by the present invention in that the network access is controlled according to a policy defined for the plurality of electronic devices operating under the same subscription. In particular, the policy defines a threshold distance between a primary electronic device and each additional electronic device belonging to said plurality of electronic devices operating under the same subscription which specifies the maximum distance from the primary electronic device which still allows to gain access to the network.

20 Claims, 14 Drawing Sheets

ACCESS CONTROL ACCORDING TO A POLICY DEFINED FOR A GROUP OF ASSOCIATED ELECTRONIC DEVICES COMPRISING A CELLULAR MODEM

TECHNICAL FIELD

The present invention relates to wireless telecommunications networks, and particularly to a method and an arrangement in a network for applying a policy to a plurality of mobile devices associated with a common user.

BACKGROUND

Current wireless cellular systems like GSM, UMTS, LTE, CDMA2000, WiMAX etc. support multiple mobile devices (e.g. phones, data cards/modems) where each device is associated with both physical-related identities and subscription-related identities. The subscription-related identities can either be stored in a Subscriber Identity Module (SIM) or directly in the mobile device (hard coded or configurable).

It is expected that the number of devices which are capable of connecting to cellular networks, sending and receiving data, will increase in the future. It is technically possible to install cellular modems in a number of portable and stationary electronic devices, e.g. cameras, ebook readers, TV/media players, fire alarms, electricity meters and other sensors. The possibilities are limitless. This offers great opportunities for cellular operators in the future to earn revenues from providing network access for these devices.

Traditionally mobile data and voice subscriptions have relied on pay per use charging (e.g. per minute, per megabyte, etc). However, the current trend is to rely more and more on flat-rate charging with unlimited or limited use at a fixed price per time unit (e.g. per month), or service-based charging where the cellular data transport is included in the service price (e.g. the price for a downloaded electronic book or song). From an end user point of view these charging methods are often preferred since they give predictability as to how much the service will cost.

Currently there is limited technical support for operators who want to offer their subscribers the possibility to connect multiple devices to their networks with some charging model which is deemed acceptable both for the operator and the end users in a reliable way.

It is assumed that the operator would like to charge more to end users who have multiple devices compared to those with just a single device. On the other hand, the end users would only accept these extra charges if they are reasonable. For example, one possible charging model would be for the operator to charge a basic subscription fee (for all users) and then a small reoccurring fee for each extra device that the user has. Other charging models can also be considered.

These charging models are possible to support in today's cellular networks; however, there is limited support for preventing abuse of the system, for example by an end user sharing or selling subscriptions with other users. If an end user has two devices which both have a cellular modem and are allowed to operate in parallel, how does the operator prevent the end user from lending or selling one of the devices to another person? This problem will grow in magnitude in the future as the number of devices that support cellular access increases.

One method to prevent such an abuse could be to limit the devices to only access specific services for which abuse is not an issue. An example of this could be a portable ebook reader which only allows access to a book seller's web site. A similar solution is possible for digital cameras, fire alarms etc. A problem arises, however, when the devices allow access to any service (e.g. the internet).

SUMMARY

According to the present invention, there is provided a method in a wireless telecommunication network. The method comprises the steps of: determining that a mobile device has connected to the network; determining that the mobile device is one of a plurality of mobile devices associated with a common user; and controlling the network access of the mobile device according to a policy defined for the plurality of mobile devices.

Accordingly, there is defined a scheme in which a plurality of mobile devices (e.g. UEs) are associated with a single user, or subscriber. The information identifying the devices as being associated may be kept on the devices themselves, or within the network. On connecting to the network, the network access of the associated device is controlled according to a policy that is defined for the plurality of associated devices. Thus, the network access of the device is controlled in real time; that is, decisions are taken regarding the access of the device in the traffic-carrying part of the network as and when the device requests that access.

In an embodiment, the method further comprises the step of determining that a second mobile device of the plurality of mobile devices has connected to the network. The step of controlling network access comprises the substep of: controlling the network access of the first mobile device according to the distance between the first mobile device and the second mobile device of the plurality of mobile devices.

In a further embodiment, the step of controlling network access comprises the substep of: limiting or preventing the network access of the first mobile device in the event that the first mobile device is determined to be more than a threshold distance from the second mobile device. This ensures that the associated devices are within a threshold distance of each other in order to gain access to the network, meaning that a user cannot lend one or more of the devices to third parties that will in general be far away.

The relative distance between the associated devices may be determined through a comparison of their location identifiers. The location identifiers may include one or more of: a cell ID of a cell that the respective mobile device is connected to, a sector ID of a cell that the respective mobile device is connected to, a base station ID of a base station that the respective mobile device is connected to, a service area ID of a service area that the respective mobile device is connected to, a tracking area ID of a tracking area that the respective mobile device is connected to, a routing area ID of a routing area that the respective mobile device is connected to, and GPS co-ordinates of the respective mobile device.

In another embodiment, the method further comprises the steps of: determining that a second mobile device of the plurality of mobile devices has connected to the network; sending a code to the second mobile device; and attempting to receive a message from the first mobile device, the message being a function of the code, and controlling the network access of the first mobile device according to whether or not the message is correctly received. This embodiment also ensures that the associated devices are either located near each other, or in close contact with each other, so that the code can be passed from the second associated device to the first associated device.

In a further embodiment, the method further comprises the step of: determining that a second mobile device of the plurality of mobile devices has connected to the network. The step of controlling network access comprises the substep of applying an upper limit to the aggregate bitrate of the first and second mobile devices.

In another embodiment, the step of controlling network access comprises the substep of: applying an upper limit to the aggregate data usage of the plurality of mobile devices in a period of time.

In a yet further embodiment, the step of controlling network access comprises the substep of: allowing a subset of the plurality of associated devices to use a particular service at a time.

Each of the three previous embodiments controls the network access of the mobile devices according to their use of the network. For example the aggregate bitrate of simultaneously connected associated devices may not be allowed to exceed a certain limit.

The present invention also provides methods of identifying a device as being one of a plurality of associated devices. In one embodiment, the first mobile device has a first identity, and the step of determining that the first mobile device is one of a plurality of mobile devices associated with a common user comprises the substep of: accessing a database, the database comprising an entry with the respective identities of each mobile device of the plurality of mobile devices.

In an alternative embodiment, the method comprises receiving information from the first mobile device identifying the other mobile devices of the plurality of mobile devices.

In various embodiments, the plurality of associated devices may all be served by the same network nodes. For example, in one embodiment, the method comprises determining that a second mobile device of the plurality of mobile devices has connected to the network; determining one or more network nodes serving the second mobile device; and assigning the one or more network nodes to the first mobile device.

By ensuring that all associated devices are served by the same network nodes, the amount of signalling between nodes may be reduced, and the policy can be applied to the devices in an efficient manner within the network.

In another aspect of the present invention, there is provided apparatus in a wireless telecommunication network, the apparatus comprising: means for determining that a mobile device has connected to the network; means for determining that the mobile device is one of a plurality of mobile devices associated with a common user; and means for controlling the network access of the mobile device according to a policy defined for the plurality of mobile devices.

The apparatus may be located in a single network node, or across multiple network nodes. For example, the apparatus may be located in one or more of: a mobility management entity, a serving GPRS support node, a GPRS gateway support node, a packet data network gateway, and a policy control and charging rules function.

In one embodiment, where the methods are performed in multiple nodes, the apparatus comprises signalling means for signalling to a remote network node that the mobile device is one of a plurality of mobile devices associated with a common user. In this way, the information regarding the associated device(s) can be propagated throughout the network.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

The present invention introduces the concept of linked subscriptions and/or devices, in which an operator may define special charging policies and/or usage restrictions. According to embodiments of the invention, the usage restrictions may be related to device mobility, location, accessed services etc. Furthermore, methods in the cellular networks are defined for how to enforce these charging policies and usage restrictions. The solutions are network controlled, which means that they can operate regardless of the device security, i.e. the solution should work even if the end user "hacks" the device to access services which are not allowed by the subscription. Moreover, their implementation within the cellular network itself allows the policies to be applied in "real time". That is, a user may have his network access restricted as and when he attempts to access the network.

Figure 1:
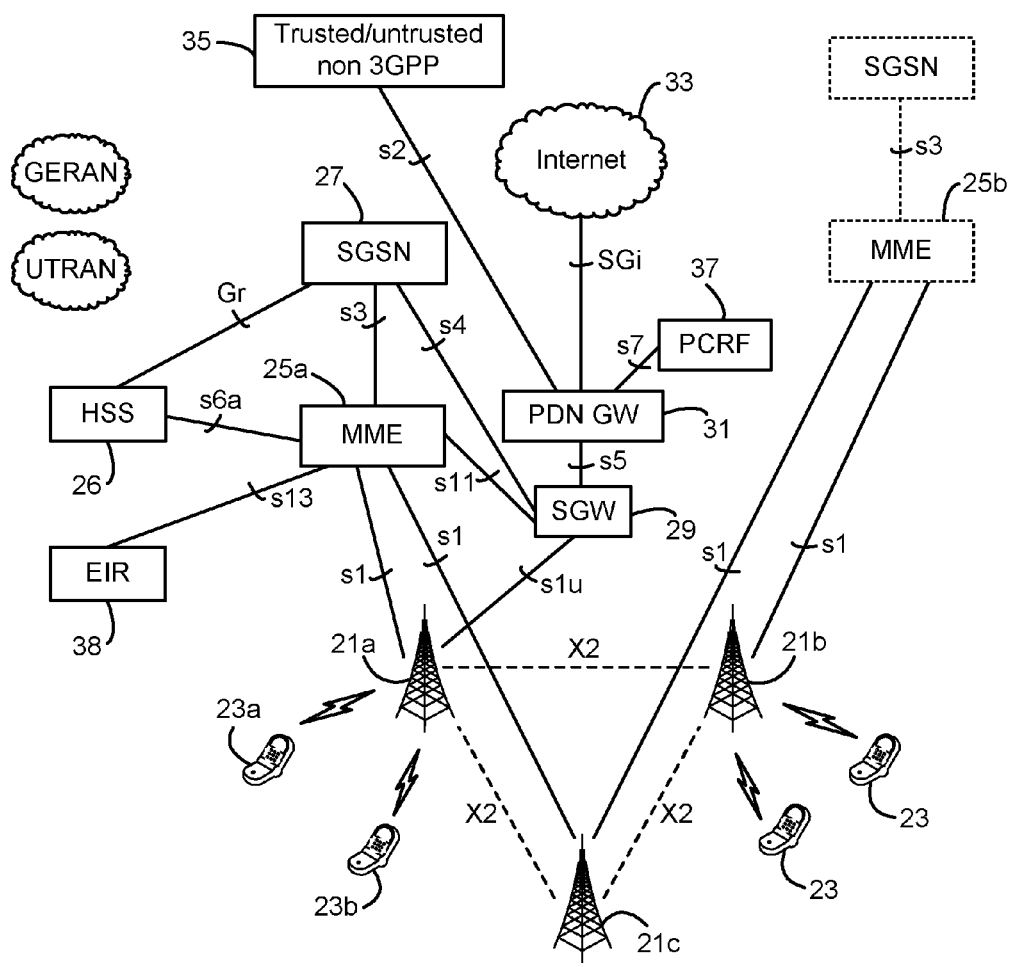
FIG. 1 shows an example of a cellular wireless network according to the present invention.

Reference will now be made to FIG. 1 which shows a more detailed overview of an example telecommunications network, known as the E-UTRAN (Evolved UMTS Terrestrial Radio Access Network) which uses the Long Term Evolution (LTE) standard. It will be apparent to those skilled in the art, however, that the present invention is applicable in other networks under different standards, including GSM, UMTS, CDMA2000, WiMAX, IMS etc.

The network comprises a plurality of radio base stations (also known as eNodeBs, Node Bs, etc) 21a, 21b, 21c, each of which maintains one or more cells (not illustrated). User Equipment ("UE", i.e. mobile devices) 23a, 23b, 23c, 23d within each cell communicate with the corresponding eNodeB 21 of that cell.

In the E-UTRAN, eNodeBs 21 are capable of communicating with one another over interfaces known as X2 interfaces (illustrated as dashed lines in FIG. 1). Each eNodeB 21 further has one or more interfaces with the core network. These are known as S1 interfaces. In particular, the eNodeBs 21 have one or more S1 interfaces to one or more Mobility Management Entities (MMEs) 25a, 25b, which will be described in more detail below.

An MME 25a, for example, is connected to a Serving GPRS Support Node (SGSN) 27 via an S3 interface. The SGSN 27 is responsible for delivery of data packets from and to the UEs 23a, 23b within its geographical service area when the UE is in GERAN or UTRAN coverage. The MME 25a interacts with a Home Subscriber Server (HSS) 26 over an S6a interface, for performing tasks such as user authentication. The SGSN 27 further interacts with the HSS 26 over a Gr interface, meaning that, when a UE is operating in GSM or UMTS modes, the SGSN 27 basically has the same functionality as the MME 25a in LTE mode. The MME 25a further interacts with an Equipment Identity Register (EIR) 38, which contains a list of "black-listed" devices which should be denied access to the network, for example because they have been recorded as stolen.

The telecommunications network also comprises a Serving Gateway (SGW) 29. The SGW 29 is shown as being connected to: an eNodeB 21a via an S1u interface; an MME 25a via an S11 interface; and an SGSN 27 via an S4 interface. It will be appreciated that an SGW 29 may be connected to one or more of each of said devices. However, a UE will in general be connected to only a single SGW and/or a single MME. An SGW 29 is adapted to perform, amongst other things, the routing and forwarding of user data packets, while also acting as the mobility anchor for the user plane during inter eNodeB handovers (for example as a UE 23a is handed over from eNodeB 21a to eNodeB 21c). The SGW 29 also acts as the anchor for mobility between LTE and other 3GPP technologies. It also manages and stores UE contexts, for example parameters of the IP bearer service, and network internal routing information.

The SGW 29 is connected to a Packet Data Network Gateway (PDN GW) 31 via an S5 interface. The PDN GW 31 provides connectivity to the UE to external packet data networks, such as the internet 33, by being the point of exit and entry of traffic for the UE.

The MME 25a is responsible, amongst other things, for idle mode UE tracking and paging procedures. It is also involved in a bearer activation/deactivation process and is also responsible for choosing the initial SGW for a UE.

As mentioned above, a PDN GW 31 provides connectivity (via an SGi interface) from the UE 23 to external packet data networks 33 (for example the internet) by being the point of exit and entry of traffic for the UE 23. A UE 23 may have simultaneous connectivity with more than one PDN GW 31 for accessing multiple PDNs 33. The PDN GW 31 performs, amongst other things, policy enforcement, packet filtering for each user, charging support, lawful interception and packet screening. Another key role of the PDN GW 31 is to act as the anchor for mobility between 3GPP and non-3GPP technologies 35, via S2 interfaces.

The PDN GW 37 performs policy enforcement using a Policy and Charging Rules Function (PCRF) 37, via an S7 interface. The PCRF 37 dynamically controls and manages all data sessions and provides appropriate charging and billing interfaces towards charging and billing systems run by operators outside the network.

Figure 2:
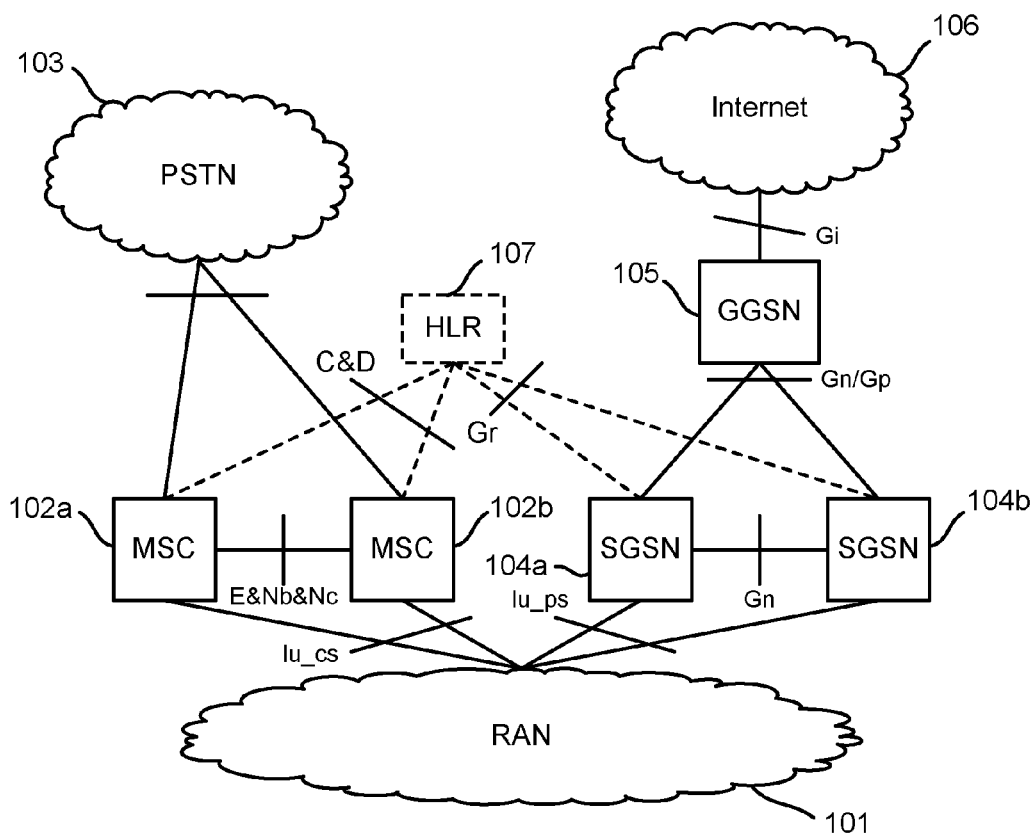
FIG. 2 shows an example of the core network of another cellular wireless network according to the present invention.

FIG. 2 shows a further example telecommunications network, for use in Global System for Mobile communications (GSM) or WCDMA/HSPA networks. The figure shows in simplified detail the core network structure of the network, and its connection to the Radio Access Network (RAN) 101.

The RAN 101 typically comprises radio base stations (also known as NodeBs) which communicate with mobile terminals (also known as user equipment). In WCDMA and HSPA networks, the RAN 101 further comprises Radio Network Controllers (RNCs) which communicate with the core network. The detailed structures of the RAN 101 are not illustrated for simplicity.

The core network is split into two domains: a circuit-switched domain and a packet-switched domain. In the circuit-switched domain, Mobile Switching Centres (MSCs) 102a, 102b communicate with the RAN 101 over Iu_cs interfaces for WCDMA/HSPA, and over the A interface in GSM (not illustrated). They can also communicate with each other over E, Nb and Nc interfaces. The MSCs 102a, 102b control access to the Public Switched Telephone Network (PSTN) 103.

In the packet-switched domain, Serving GPRS Support Nodes (SGSNs) 104a, 104b communicate with the RAN 101 over Iu_ps interfaces in WCDMA/HSPA, and over the Gb interface in GSM (not illustrated). They can also communicate with each other over a Gn interface. The SGSNs 104a, 104b communicate with a Gateway GPRS Support Node (GGSN) 105 over the Gn or Gp interfaces. The GGSN 105 controls access to external packet networks via a Gi interface, for example to the internet 106 as illustrated, or to an operator's service domain, or an IMS network.

Common to both circuit- and packet-switched domains is a Home Location Register (HLR) 107, a database in the home operator's network that keeps track of the subscribers of that operator. The HLR 107 is coupled to the MSCs 102a, 102b via C and D interfaces, and to the SGSNs 104a, 104b via Gr interfaces.

FIGS. 1 and 2 show example networks in which the present invention may be performed. However, it will be apparent to those skilled in the art that the principles described herein may be applied to different networks, achieving the same benefits and advantages. Accordingly, the present invention is not limited to the example networks described above.

Figure 3:
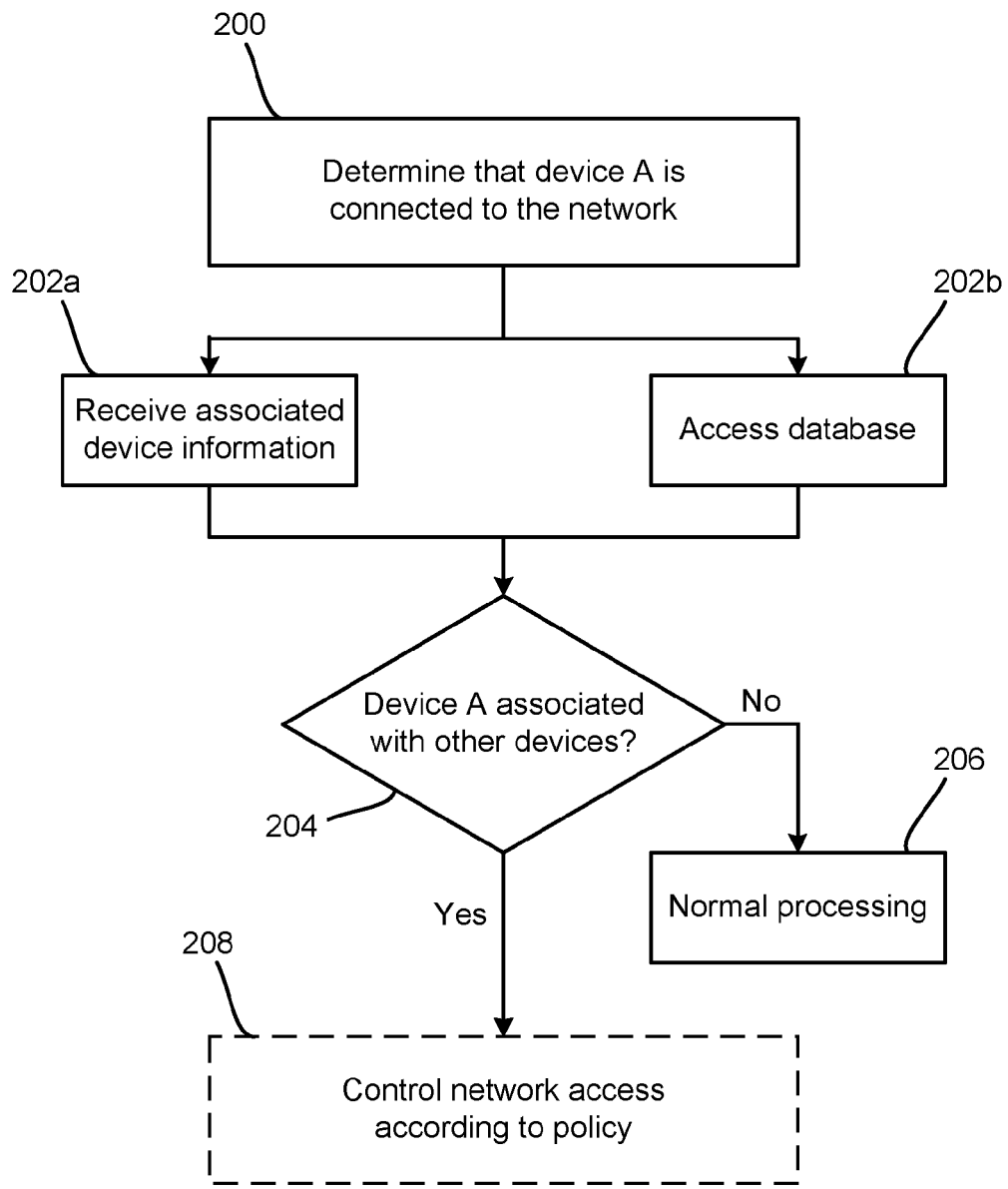
FIG. 3 is a flowchart of a method according to embodiments of the present invention.

FIG. 3 is a flowchart showing a method in a wireless network according to embodiments of the present invention.

In step 200, the network determines that a first mobile device (hereinafter denoted "device A") has connected to the network. Further details of the process for connecting to the network will be described below.

The method then proceeds from step 200 to one of steps 202a and 202b. In one embodiment (step 202a), device A sends to the network information identifying one or more mobile devices that are associated with device A. This information may have been sent as part of the procedure for connection to the network, or after connection to the network. That is, information about which devices are associated (linked) with other devices can be stored in the mobile device or the Subscriber Identity Module (SIM). The information can be passed to the network during the network attach procedure and the authenticity of the information stored in the device or SIM can be verified by the network using some security mechanism.

In this embodiment, the information identifying the associated mobile devices may be a list of physical identities of the associated devices. Alternatively, the plurality of associated mobile devices may be given a common index that allows them to be readily determined as being associated.

In another embodiment (step 202b), the information identifying associated devices is stored in a database in the network. In the network described with respect to FIG. 1, the database may be part of the HSS 26, for example. In another embodiment, the information may be stored in the PCRF 37;

and in other standards, the Authentication, Access control and Accounting server (AAA server) or the Home Location Register (HLR) may be used.

In step 204 it is determined whether device A is associated with any other mobile devices. Of course, it will be understood that this step may be performed concurrently with the earlier steps. For example, if the network has received information from device A in step 202a, it will already have determined that the device has associated mobile devices.

If there are no associated devices, the handling of device A may proceed as normal (step 206).

If there are one or more associated devices, the network proceeds to apply a policy to the handling of device A, the policy being defined for the plurality of associated devices as a whole (step 208). In the illustrated embodiment, the network controls the network access of device A according to the policy. That is, in response to the policy being breached by the user of device A, the network access of device A may be limited or prevented altogether. In other embodiments, the network may apply an increased charge to the user of the plurality of devices for breaching the policy.

The method described with respect to FIG. 3 can be performed in a single device in the network, or different steps may be performed in different devices. For example, an MME or an SGSN may determine in step 200 that a particular device has connected to the network, and determine that the device is associated with other devices in steps 202 and 204. The MME or SGSN may then go on to apply the policy in step 208, for example by instructing the PDN GW or GGSN (as necessary) to limit or prevent the network access of the device if the policy is violated. In an alternative example, the PDN GW or GGSN may determine that a particular device has connected to the network, and that the device is one of a plurality of associated devices (for example, by communicating with the MME or SGSN). The PDN GW or GGSN can then apply the policy and prevent of limit the network access of the device if the policy is violated.

Figure 4:
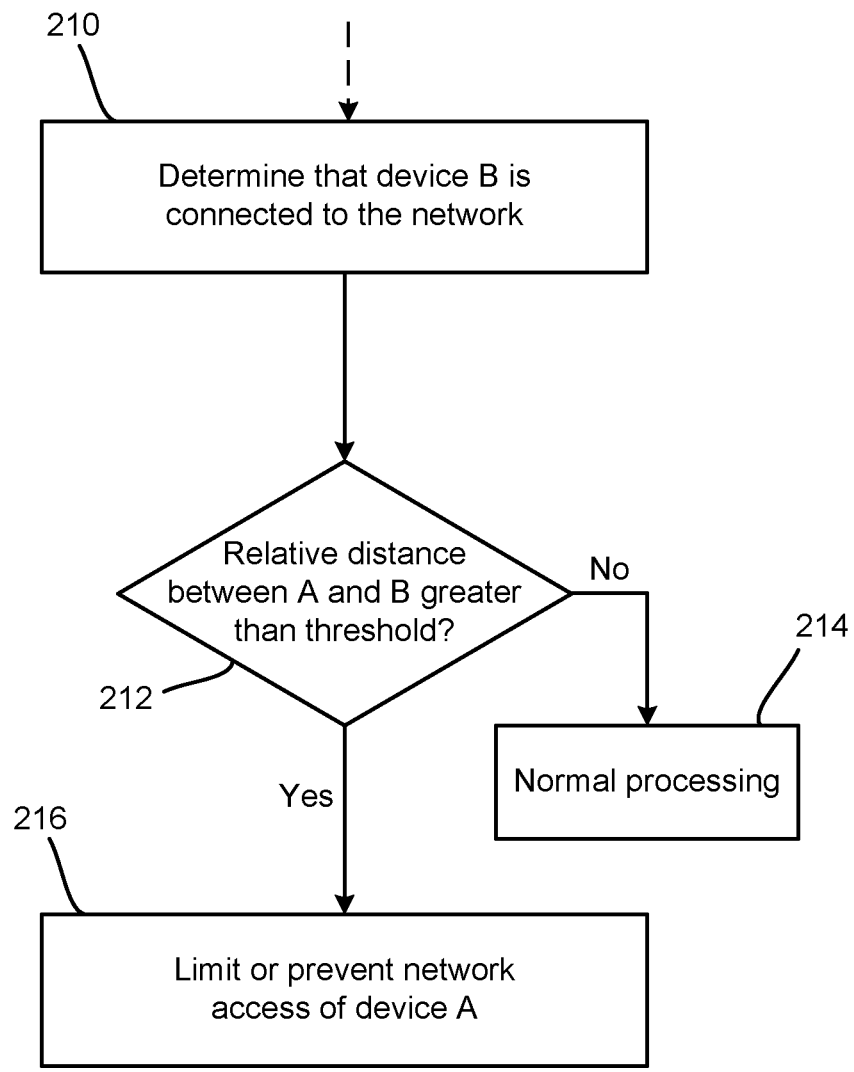
FIG. 4 is a flowchart of a method according to further embodiments of the present invention.

FIG. 4 is a flowchart of a method according to one embodiment of the present invention, in which a policy is applied to the plurality of associated mobile devices based on their relative distance from each other. The method proceeds from that described with respect to FIG. 3, and essentially describes substeps of step 208, in which a policy is applied to device A.

In step 210, it is determined that a second mobile device of the plurality of associated devices (labelled hereinafter "device B") is also connected to the network.

In step 212, the relative distance between the two devices A and B is determined, and compared with a threshold. If the relative distance is below the threshold (i.e. device A and device B are relatively close to each other), the network access of the devices is handled normally (step 214). That is, the devices are allowed to access services and to receive the standard of service that they would normally expect.

If the relative distance is greater than the threshold, it is determined that the conditions of the policy have been broken, and the network access of device A and/or device B is limited, or prevented altogether (step 216). In one embodiment, one of the plurality of associated devices may be defined as the "primary" device, which should always be served. For example, if device B were the primary device, the network access of device may be limited or stopped and the access of device B unaffected. In an alternative embodiment, the network access may not be altered, but an increased charge may be applied to the user of the devices for breaching the terms of the policy.

The method set out in FIG. 4 therefore prevents, or at least hampers, a user who wishes to lend or sell a subscription or device to a third party. If two associated devices are used simultaneously a substantial distance apart, it can be assumed that it is not the same user using the devices, and at least one of the devices has been lent to a third party. In this instance, the network access of one or both of the devices is limited or stopped.

The relative distance of the two devices may be determined in a number of ways. For example, if the linked devices are all served by the same MME 25 or SGSN 27, the MME/SGSN can check the rough location of the devices to determine if they are deemed close enough. The location of the devices may be determined based on which radio cells/sectors or base stations (eNBs) the devices are connected to, or it can be based on GPS coordinates or logical concepts such as Service Areas, Tracking Areas, Routing Areas, etc. In case the MME 25 or SGSN 27 does not have the relevant location information, it can request this information from the RAN, the devices themselves, or location servers.

The threshold distance may be implemented in a number of ways. In one example, the devices may be deemed unacceptably far apart if their respective location identifiers are not identical. However, due to radio properties it is possible that even two devices located very close to each other may connect to different radio cells and base stations. The threshold distance may therefore be slightly more relaxed allowing usage also in these scenarios that could occur naturally. For example, devices operating in adjacent cells or sectors may be allowed to access the network freely, while devices operating in non-adjacent cells or sectors are prevented from accessing the network.

In case the linked UEs are served by different MMEs 25 and/or SGSNs 27, the respective MMEs or SGSNs can perform signalling between each other to exchange location information so that it can be verified that devices being used simultaneously are within the threshold distance of each other. In case it is determined that the policies are being violated, one MME or SGSN may enforce the policy (e.g. drop the connection of its respective device) or inform the other MME or SGSN to do this.

In an alternative embodiment, the LoCation Services (LCS) system may be used. The LCS system is still under discussion in the 3GPP standardization meetings, but will in general be connected to the MME (see, e.g. 3GPP TS 23.891). The system may include multiple new nodes and multiple interfaces, and employed as a separate overlaid system in the network. In one embodiment, the LCS system requests periodic reporting of the locations of the group of associated devices and checks the distances between the devices. The output is either fed into the PCRF 37 (e.g. to incur an increased fee charge), or a command is sent to the MME 25 or SGSN 27 to disconnect a device when it is deemed to be in a forbidden location. Alternatively, the LCS system may periodically poll for the location of the devices on its own. The LCS system may also obtain data on the location of UEs from various network nodes or positioning equipment, rather than from the UEs directly.

In yet further alternative embodiments, it is also possible for other network nodes (e.g. RAN nodes, Charging system, PDN GW/GGSN) and systems to enforce location-based policies. Common to these solutions is that the nodes enforcing the policy are aware of the locations of the devices and of which devices are associated with each other.

According to further embodiments of the present invention, policies may be enforced across the plurality of mobile devices based on the usage of the network.

Figure 5:
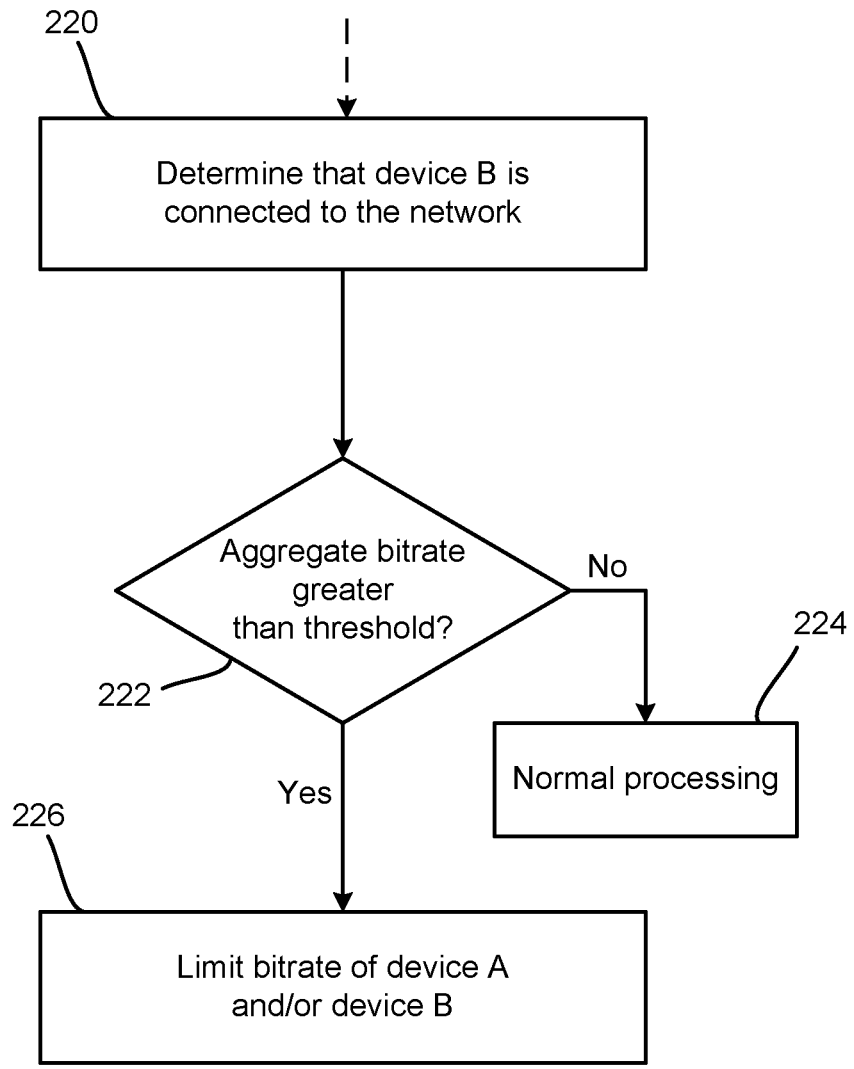
FIG. 5 is a flowchart of a method according to other embodiments of the present invention.

FIG. 5 is a flowchart of a method according to one such embodiment of the present invention, in which a policy is applied to the plurality of associated mobile devices based on the aggregate bitrate of the devices. The method proceeds from that described with respect to FIG. 3, and essentially describes substeps of step 208, in which a policy is applied to device A.

In step 220 it is determined that a second mobile device of the plurality of associated devices (labelled hereinafter "device B") is also connected to the network.

In step 222, the aggregate bitrate of the two devices A and B is determined, and compared with a threshold. If the aggregate bitrate is lower than the threshold, the network access of the devices is handled normally (step 224). That is, the devices are allowed to access services and to receive the standard of service that they would normally expect.

If the aggregate bitrate is greater than the threshold, the bitrate of device A and/or device B is limited in the illustrated embodiment so that the aggregate threshold is not exceeded (step 226). Similar to the method described with respect to FIG. 3, one of the devices may be defined as a primary device whose network access is preferably not limited. For example, if device B is the primary device and the threshold is exceeded, the bitrate of device A may be limited until the aggregate bitrate is below the threshold. Of course, even in this embodiment it may be necessary to limit the bitrate of device B if its bitrate alone exceeds the aggregate threshold.

Again, in an alternative embodiment, rather than limiting the bitrate of the devices, an additional charge may be levied to the user of the associated devices in the event that the threshold is exceeded.

Although described with respect to a single pair of devices, it will be apparent that this method is applicable to one or more associated devices. The threshold value is compared with the aggregate bitrate of all simultaneously connected associated devices.

Figure 10:
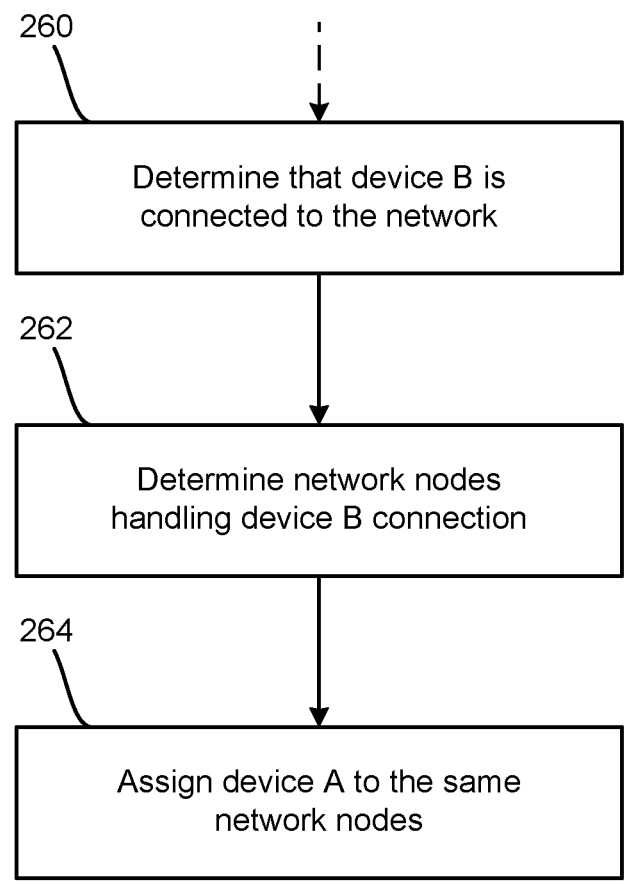
FIG. 10 is a flowchart of a method according to embodiments of the present invention.

In the case where the network assigns all the associated devices to the same PDN GW 31 or GPRS Gateway Support Node (GGSN) it is possible for this PDN GW or GGSN to enforce the data usage policy of the multiple devices (see FIG. 10 for more details). Examples of enforcing the policy to reduce the bitrate include dropping packets and/or blocking or releasing some services. It is also possible, however, for multiple PDN GWs or GGSNs to communicate with each other to apply the policy, for example communicating the current bitrate of each device to the other node.

Figure 6:
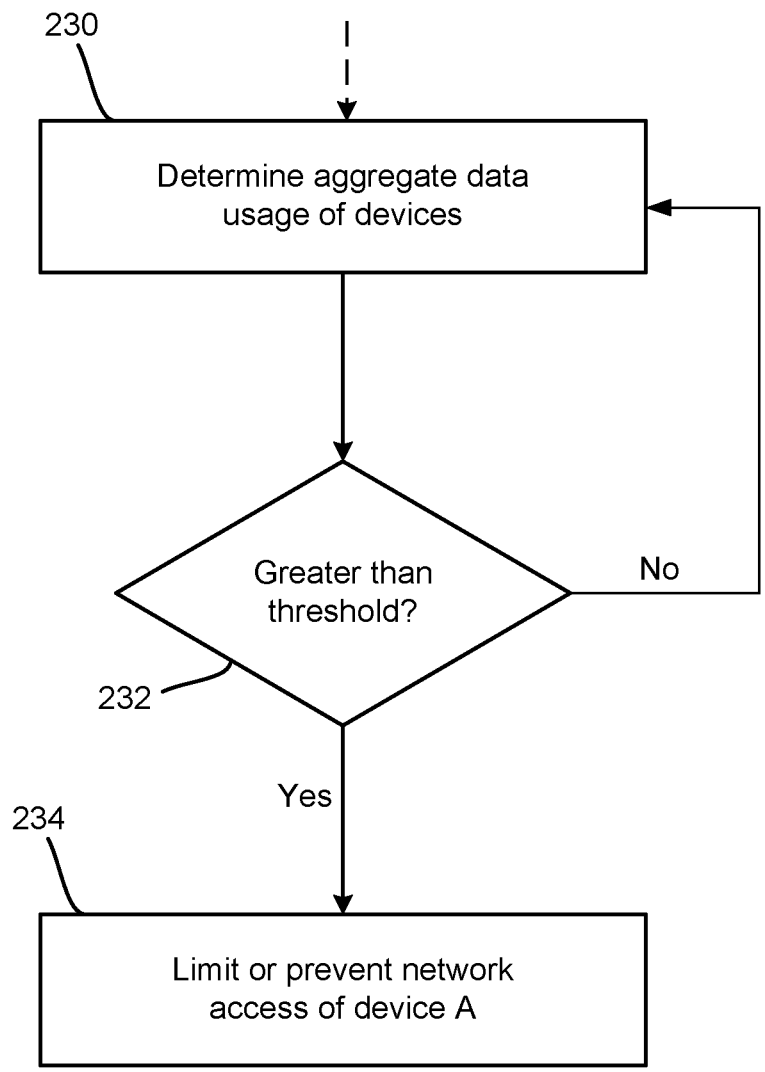
FIG. 6 is a flowchart of a method according to yet further embodiments of the present invention.

FIG. 6 is a flowchart of a method according to one embodiment of the present invention, in which a policy is applied to the plurality of associated mobile devices based on the aggregate data usage of the devices over a period of time. The method proceeds from that described with respect to FIG. 3, and essentially describes substeps of step 208, in which a policy is applied to device A.

In step 230, the aggregate data usage of all of the plurality of associated devices in a period of time is determined, that is, the total amount of data downloaded by the plurality of associated devices for the time period in question. For example, the data usage may be the downloaded data during the month in which the method is performed.

In step 232, this aggregate data usage is compared with a threshold. If the data usage is below the threshold, the method moves back to step 230; thus, the aggregate data usage is continually, or periodically, checked. If the aggregate data usage exceeds the threshold, the method moves to step 234, and the network access of device A may be limited or prevented altogether. In an alternative embodiment, an additional charge may be levied to the user of the associated devices in the event that the threshold is exceeded.

In the case where the network assigns all the associated devices to the same PDN GW 31 or GPRS Gateway Support Node (GGSN) it is possible for this PDN GW or GGSN to enforce the data usage policy of the multiple devices. It is also possible, however, for multiple PDN GWs or GGSNs to communicate with each other to apply the policy, for example communicating to the other node the current amount of data sent to each device.

Figure 7:
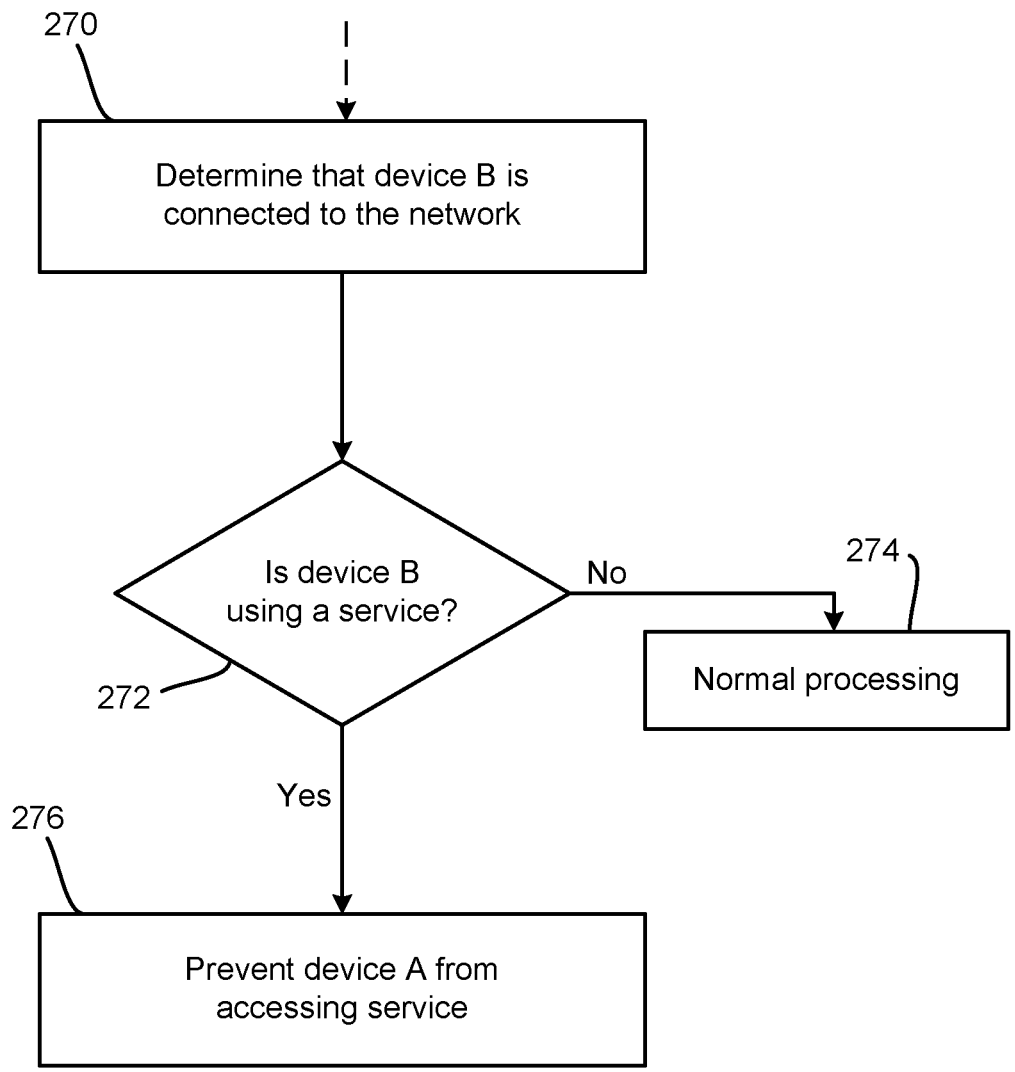
FIG. 7 is a flowchart of a method according to embodiments of the present invention.

FIG. 7 is a flowchart of a method according to another embodiment of the present invention, in which a policy is applied to the plurality of associated mobile devices based on the services used by those devices. The method proceeds from that described with respect to FIG. 3, and essentially describes substeps of step 208, in which a policy is applied to device A.

In step 270 it is determined that a second mobile device of the plurality of associated devices (labelled hereinafter "device B") is also connected to the network.

In step 272, it is determined whether device B is using a particular service of the network. For example, one such service may be a voice service (i.e. making a call). Other examples include particular applications or sessions, such as music or video services.

If device B is not using the service, the method proceeds to step 274, and the network access of device A is handled normally. That is, the user of device A is allowed to access the service if he or she wishes to do so.

If device B is using the service, the method proceeds to step 276, and device A is prevented from accessing the service. In an alternative embodiment, rather than limiting the access of device A, an additional charge may be levied to the user of the associated devices.

This embodiment therefore prevents two associated devices from accessing services, or a particular service, at the same time. For example, the devices may be prevented from making voice calls at the same time, as this would indicate that different users are using the devices. However, the method may also be applied such that a subset of the plurality of associated devices is allowed to access services or the same service at the same time, wherein the subset is equal to one or more of the associated devices.

As with embodiments described above, one of the associated devices may be determined a "home" or "primary" device, which is given priority over the other devices. In this case, the primary device (whether device A or device B according to the description above) would be allowed to access the service, and the other device(s) denied access to the service. In this case, the subset is equal to one device.

Figure 8:
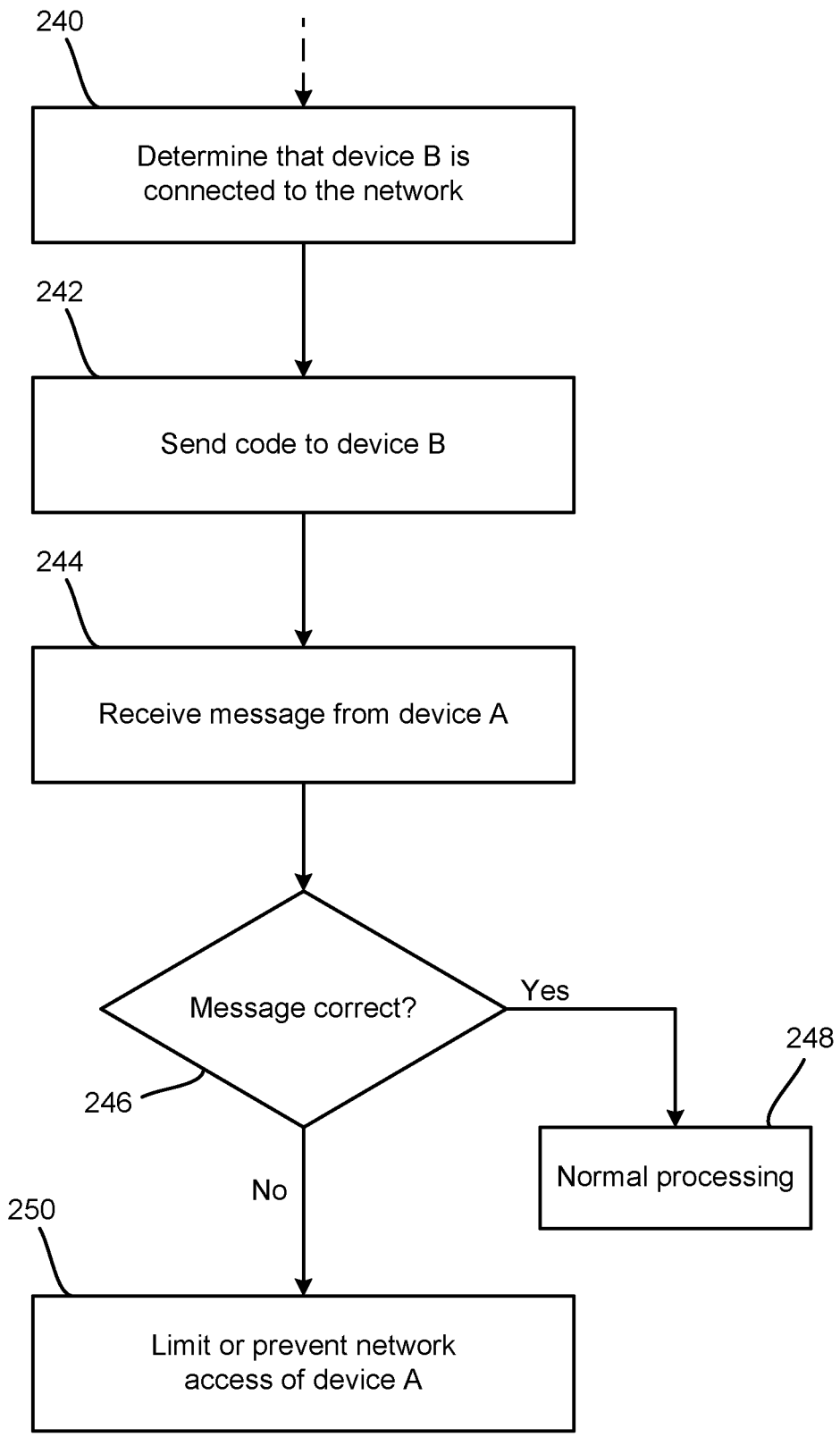
FIG. 8 is a flowchart of a method according to embodiments of the present invention.

FIG. 8 is a flowchart of a method according to one embodiment of the present invention, in which an alternative method is employed to ensure the associated devices are close to each other. The method proceeds from that described with respect to FIG. 3, and essentially describes substeps of step 208, in which a policy is applied to device A.

In step 240, it is determined that a second mobile device of the plurality of associated devices (labelled hereinafter "device B") is also connected to the network. In this embodiment, device B is the primary device of the plurality of associated devices. It will be apparent to those skilled in the art that this step may not be performed in the strict order shown, but rather may have occurred prior to device A connecting to the network in step 200.

In step 242, a secret code is sent to device B. The code may be a random string of data, for example. Device A then obtains the code from device B by some local communication means such as Bluetooth, WLAN or fixed cable. In one embodiment, the user of the devices may simply read the code on device B and manually enter the code in device A.

In step 244, the network receives a message from device A, reporting a function of the secret code sent to device B. The reporting message may contain an identical code to that sent to device B, or a hash function of the code, for example.

In step 246, the reported code is checked. If it is correct, the network access of device A is allowed and handled normally (step 248), as it is assumed the two devices are relatively near to each other in order for the code to reported from device B to device A.

If the reported code is incorrect, or no code is reported, the network access of device A may be limited or prevented altogether (step 250). In an alternative embodiment, the network access is unaffected but an increased fee for the user may be incurred.

The method may be performed periodically, to check that devices A and B are close to each other throughout their use, or once on the initial connection of each device to the network.

The solution disclosed with respect to FIG. 8 will not completely prevent abuse alone; it will however make it more inconvenient to abuse the subscription policies.

As described above, there are various ways in which the network can determine that a mobile device that connects to the network is associated with one or more other devices. The device may send information to the network via an eNodeB on connection to the network; alternatively this information may be stored in a database within the network itself. For example, the database may include a list of physical or subscription identities for each group of associated devices. However, it is then necessary to propagate this information to the various network nodes handling the associated device or devices connected to the network.

Figure 9:
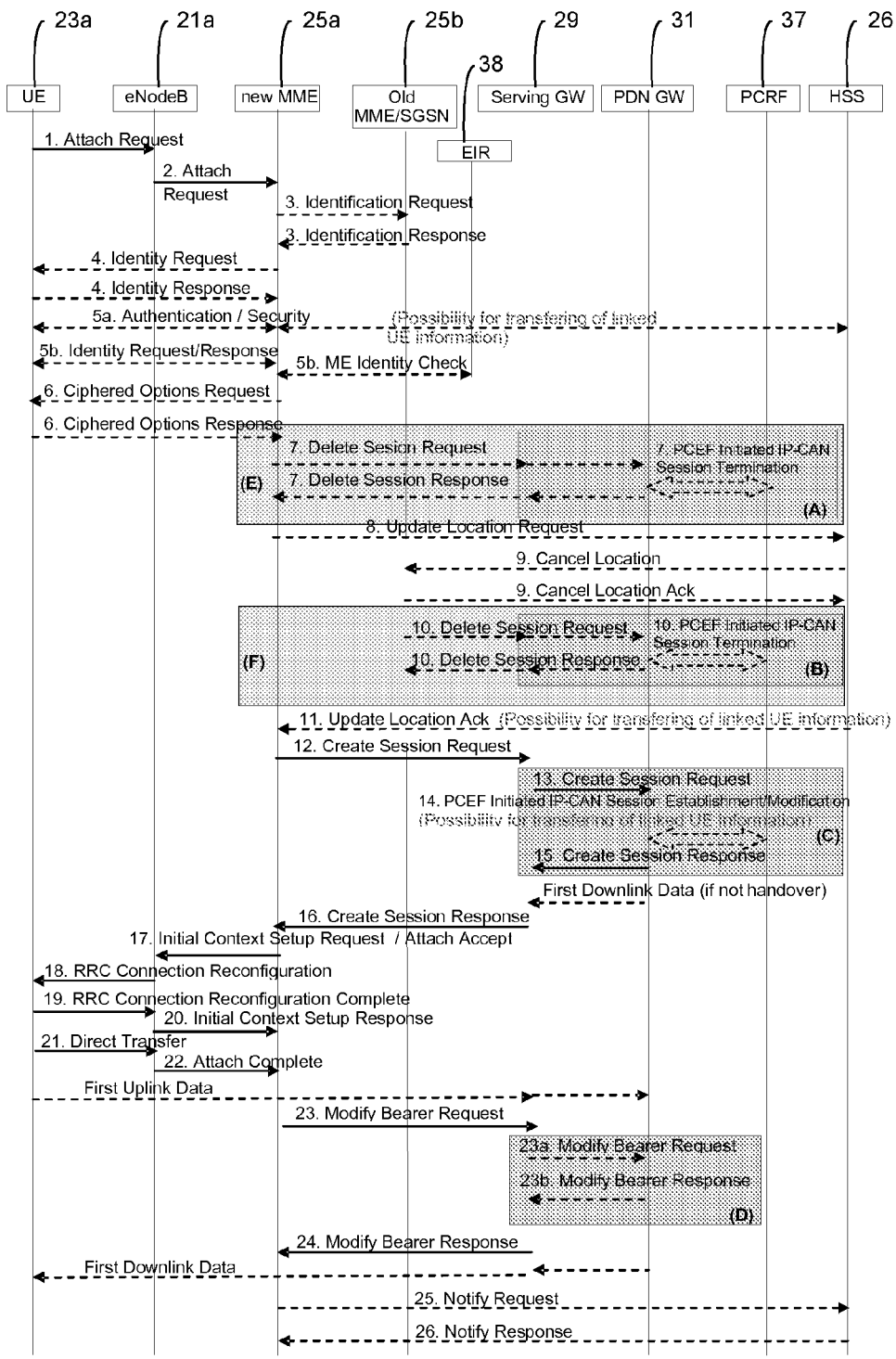
FIG. 9 shows a signalling diagram for connection to the network according to embodiments of the present invention.

The devices register or the subscription register (which may in practice be the same register, depending on the particular network in which the invention is employed) may inform the network nodes handling the devices (e.g. 3GPP SGSN/MMEs) about the existence of associated devices and the relevant policies for handling these UEs. The information can be passed to the network nodes handling the devices when it attaches to the network or performs some other signalling. This information allows the associated devices to be handled differently from normal devices. FIG. 9 shows an example in which the information identifying associated devices is propagated during the 3GPP EPS Attach procedure (in step 5a and/or 11 and/or 14). This procedure would be well known to those skilled in the art and is described fully in specification 3GPP 23.401. Three examples are shown of when the information may be passed to other devices in the network; however, alternative arrangements are possible.

In various embodiments disclosed above, it is convenient for the plurality of associated devices to be handled by the same network nodes (e.g. the same MME, SGSN, PDN GW, etc). This allows the policies defined above to be handled and applied by the same network, giving clear advantages in reducing signalling that would otherwise be required between the network nodes respectively handling each mobile device of the associated devices.

FIG. 10 is a flowchart of a method according to one embodiment of the present invention, in which the network nodes of one associated device are assigned to another simultaneously connected associated device. The method may be performed as part of the method described with respect to FIG. 3, for example occurring between steps 204 and 208.

In step 260, it is determined a second mobile device of the plurality of associated mobile devices is connected to the network (hereinafter labelled "device B"). In one embodiment, device B is the "primary device" of the plurality of associated mobile devices, i.e. that device which should preferably receive the optimum performance.

In step 262, the network nodes (e.g. MME, SGSN, PDN GW, etc) handling the connection of device B are determined. For example, the devices/subscription register can provide information about the location (in which network nodes) device B is being handled.

In step 264, device A is assigned to those same network nodes that are handling the connection of device B. Different ways are possible to perform the network node change, it could be possible to use a modified version of the MME/SGSN load re-balancing procedure defined in 3GPP 23.401 section 4.3.7.3, or some new inter-MME/SGSN handover procedure can be defined. The MME/SGSN can also receive an appropriate Globally Unique Temporary ID (GUTI) or Packet-Temporary Mobile Subscriber Identity (P-TMSI) from the device register or the subscription register which is associated with the MME/SGSN that is handling other associated devices, and the MME can then assign this GUTI/P-TMSI to the device and then trigger an S1 (or Iu) release procedure. The next time the device contacts the network the RAN will select the MME/SGSN associated with the other associated devices.

Of course, in general there may be more than two associated devices, and the method described above is applicable to any number of devices being assigned to the same network nodes.

Figure 11:
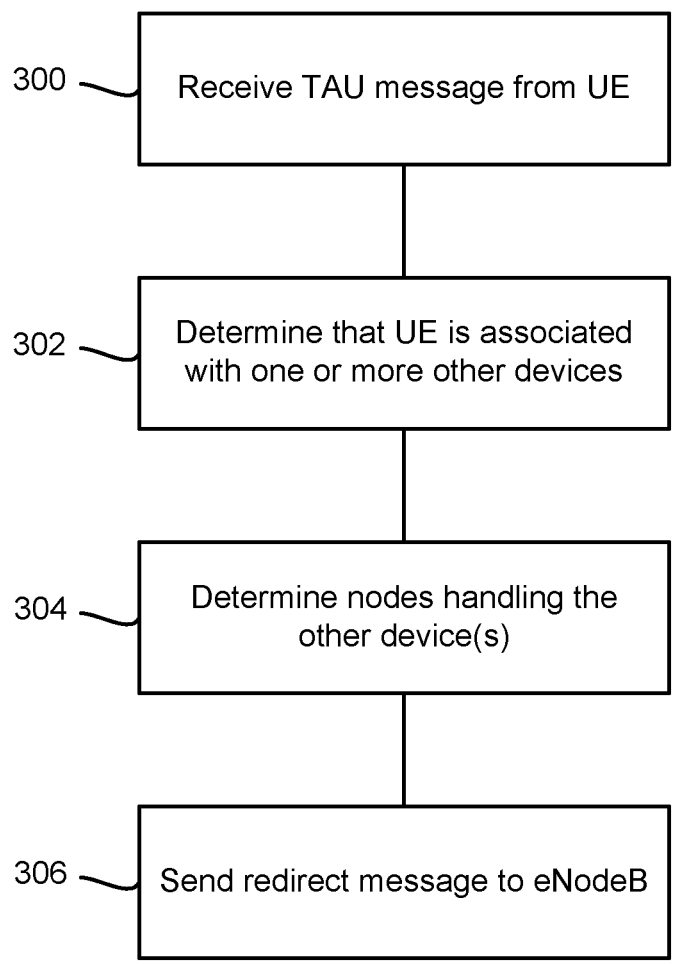
FIG. 11 is a flowchart of a method according to embodiments of the present invention.

FIG. 11 is a flowchart of an example method in transferring the network nodes of one associated device to another, comprising a modification to the Tracking Area Update (TAU) procedure described in 3GPP 23.401 (see section 5.3.3.2, or section 5.3.3.1 should there be SGW relocation). The method is generally performed in an MME.

In step 300, a TAU request message is received from the UE, via an eNodeB on an s1 interface. Tracking area updates occur when the UE moves from one tracking area to another tracking area.

In step 302, the MME determines that the UE is associated with other devices, as described above. For example, the information regarding the associated devices may be retrieved from the HSS.

In step 304, provided that the UE is associated with other devices, the network nodes (e.g. the MME, SGSN, PDN GW etc) handling those devices are determined. Again, this information may be stored in and retrieved from the HSS.

Assuming the network nodes handling the UE are different from those handling the associated devices, the MME then determines that the UE should be assigned to the new network nodes. In step 306, the MME sends a redirect message to the eNodeB serving the UE. The redirect message includes the TAU request message itself, as well as the identity of the new MME.

In further steps (not illustrated), the eNodeB forwards the TAU request message to the MME as specified in the redirect message, and the TAU procedure (involving MME relocation) is handled normally from that point onwards (see 3GPP 23.401 section 5.3.3.2 or 5.3.3.1).

Thus, the UE has been transferred from one MME to another MME that is handling the associated devices.

This method is present as an example, and alternative methods will be apparent to those skilled in the art. For example, the 3GPP specifications provide for handover procedures between eNodeBs and their respective MMEs (see 3GPP 23.401, section 5.5.1.2.2). According to an embodiment of the present invention, a handover procedure may be specified in which the source eNodeB and the target eNodeB are the same. Thus, in this procedure, only the MMEs are changed as part of the handover. The handover procedure may be initiated by a trigger message from the source MME to the source eNodeB to being the handover.

In an alternative embodiment, a linked device may acquire a temporary id (GUTI/P-TMSI) from another linked device (e.g. a "primary" device) when it attempts to connect to the network. This is possible in many ways:

- By use of an alternative communication channel between the linked device with the primary device such as WLAN, Bluetooth, fixed Ethernet, wired or wireless USB etc;
- By manually entering a code in the linked device, based on a code given by the primary device (see FIG. 8);
- By using a temporary 3GPP session, i.e. the linked device first connects normally using the temporary session, gets the code from the primary device over 3GPP access, and then re-connects again using the code;
- By the network assigning the temporary id based on knowledge of the primary device's location. For example, the primary device's IMSI can be configured into the HSS subscription records, and the HSS may provide the identity of the MME/SGSN node based on IMSI during the connection setup phase. The temporary id is constructed as a function of the primary device's MME/SGSN node and the IMSI.

The temporary id (GUTI/P-TMSI) given to the linked device is based on that of the primary device, and may be calculated as a function of it. Specifically, in one embodiment, bits identifying the MME/SGSN node in the network would be the same for the linked device as for the primary device. Note that security mechanisms such as hash functions, encryption, and integrity protection may be employed so that the temporary id does not need to be sent in cleartext.

Using the derived temporary id, the linked device can make sure that it connects to the same MME/SGSN as the primary device. The MME/SGSN must be able to link the device using derived temporary id with the primary device and may then allow access only if certain conditions are met, such as geographical proximity of the devices (e.g. see FIG. 4).

Alternatively, if it is undesirable to perform the network node relocation or to handle all associated devices in the same network nodes, it possible to perform coordination between the network nodes using direct signalling or via the devices/subscription register. For example, a first MME handling device A might receive information from the HSS identifying the location of a second MME handling device B. The first MME can then contact the second MME and exchange information about the location of the associated devices and the PDN GW that is assigned to those associated devices. With the help of this information the MMEs can verify if the policies for the linked devices are fulfilled and also assign the same PDN GW to all linked UEs. The information exchange between MMEs may be triggered periodically or based on some event (service activation, mobility, etc).

It will be apparent from the above description that the methods and functionality described herein may be employed in single network nodes, or may require the interaction of multiple network nodes. Described below are some examples of single nodes that may be used to implement the methods according to embodiments of the present invention.

Figure 12:
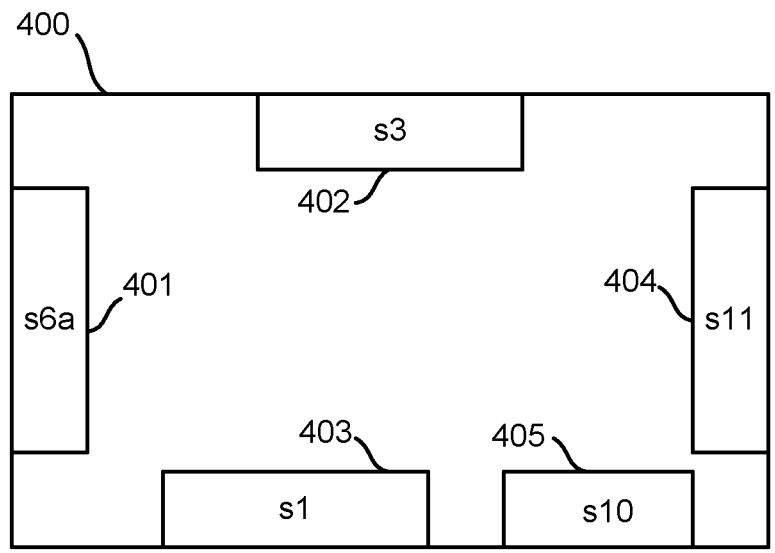
FIG. 12 shows a Mobility Management Entity (MME) according to an embodiment of the present invention.

FIG. 12 shows a Mobility Management Entity (MME) 400 according to one aspect of the present invention.

The MME 400 comprises s6a interface circuitry 401, for sending messages to and receiving messages from the HSS; s3 interface circuitry 402, for sending messages to and receiving messages from the SGSN; s1 interface circuitry 403 for sending messages to and receiving messages from eNodeBs; s11 interface circuitry 404, for sending messages to and receiving messages from the SGW; and s10 interface circuitry 405 for sending messages to and receiving messages from other MMEs.

In operation, the MME may be operable in one embodiment to perform the method described with respect to FIG. 3. The s1 interface circuitry 403 may communicate with an eNodeB, and so determine that a particular device ("device A") has connected to the network. The s6a interface circuitry 401 may communicate with the HSS, and so determine that the device is one of a plurality of associated devices. The s11 interface circuitry 404 can then act to apply a policy to the network access of the device, by communicating with the SGW and/or the PDN GW (via the SGW), preventing or limiting the network access of the device.

It will also be apparent that the MME 400 can perform various other methods as described above. For example, the MME 400 conventionally tracks the location of devices in the network, so can apply location-based policies as outlined in FIG. 4. It may also ensure that an associated device is handled by the same network nodes as other associated devices by communicating with other MMEs through the s10 interface circuitry 405, for example by signalling information that the device is one of a plurality of associated devices.

Figure 13:
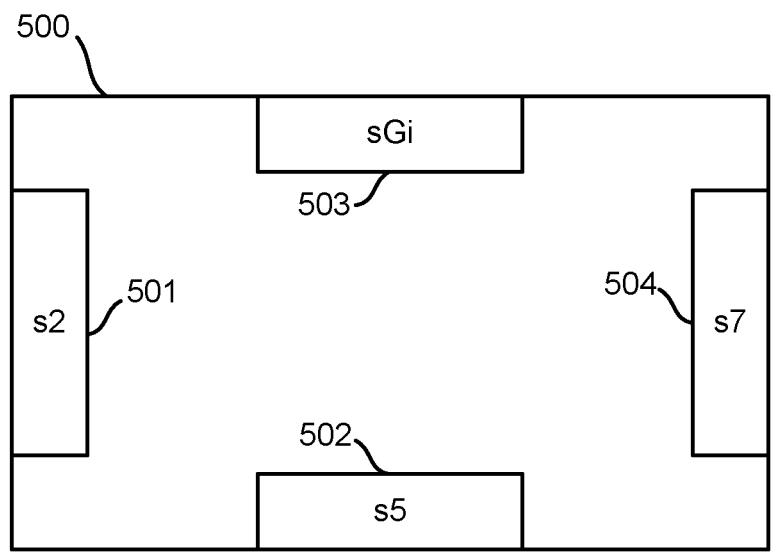
FIG. 13 shows a Packet Data Network Gateway (PDN GW) according to an embodiment of the present invention.

FIG. 13 shows a Packet Data Network Gateway (PDN GW) 500 according to one aspect of the present invention.

The PDN GW 500 comprises s2 interface circuitry 501, for sending messages to and receiving messages from non 3GPP networks; s5 interface circuitry 502, for sending messages to and receiving messages from the SGW; sGi interface circuitry 503 for sending messages to and receiving messages from external packet data networks, such as the internet; and s7 interface circuitry 504, for sending messages to and receiving messages from the PCRF.

In operation, the s5 interface circuitry 502 may determine that a device has connected to the network in that the device requests (via the SGW) access to external packet data networks. The PDN GW 500 may also determine, via the s5 interface circuitry 502, that the device is associated with one or more other devices, through communication with the MME or SGSN. Alternatively, the PDN GW 500 may determine that the device is associated with one or more other devices through communication with the PCRF over the s7 interface circuitry 504. The sGi interface circuitry 503 then acts to apply the policy by limiting or preventing the network access of the device in the event that the policy is violated.

Figure 14:
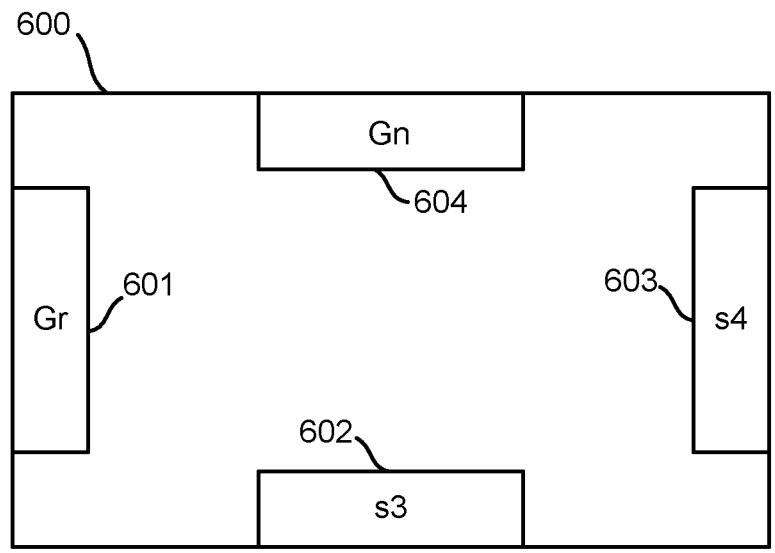
FIG. 14 shows a Serving GPRS Support Node (SGSN) according to an embodiment of the present invention.

FIG. 14 shows a Serving GPRS Support Node (SGSN) 600 according to one aspect of the present invention. In the example shown, the SGSN 600 is implemented in a network as described with respect to FIG. 1.

The SGSN 600 comprises Gr interface circuitry 601, for sending messages to and receiving messages from the HSS; s3 interface circuitry 602, for sending messages to and receiving messages from the MME; s4 interface circuitry 603, for sending messages to and receiving messages from the SGW; and Gn interface circuitry 604 for sending messages to and receiving messages from other SGSNs.

In operation, the SGSN 600 may work in a similar fashion to the MME 400 described above. That is, the s3 interface circuitry 602 may communicate with an MME, and so determine that a particular device ("device A") has connected to the network. The Gr interface circuitry 601 may communicate with the HSS, and so determine that the device is one of a plurality of associated devices. The s4 interface circuitry 603 can then act to apply a policy to the network access of the device, by communicating with the SGW and/or the PDN GW (via the SGW), preventing or limiting the network access of the device.

Figure 15:
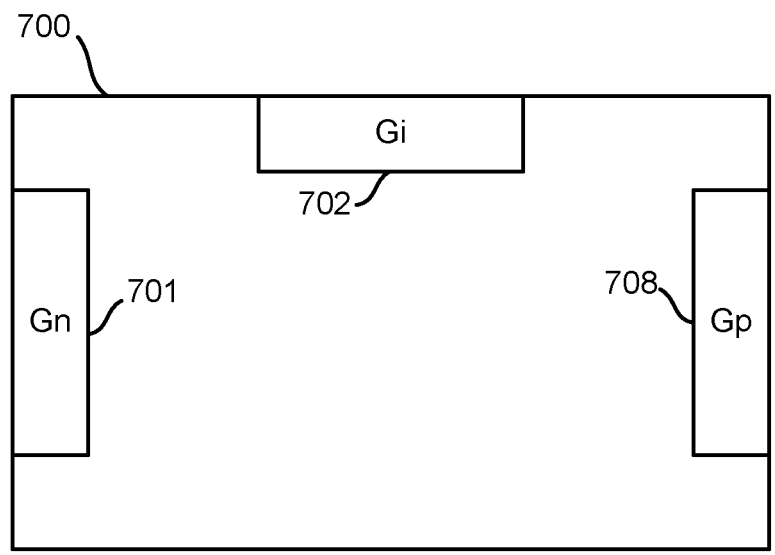
FIG. 15 shows a GPRS Gateway Support Node (GGSN) according to an embodiment of the present invention.

The SGSN 600 may also ensure that an associated device is handled by the same network nodes as other associated devices by communicating with other SGSNs through the Gn interface circuitry 604. Also, the Gn interface circuitry 604 may signal information to other nodes that the device is one of a plurality of associated devices FIG. 15 shows a GPRS Gateway Support Node (GGSN) 700 according to one aspect of the present invention.

The GGSN 700 comprises Gn interface circuitry 701, for sending messages to and receiving messages from SGSNs; Gi interface circuitry 702, for sending messages to and receiving messages from external packet data networks, such as the internet; and Gp interface circuitry 703, for sending messages to and receiving messages from SGSNs.

In operation, the Gn or Gp interface circuitry 701, 703 communicates with an SGSN, and so determines that a device has connected to the network, in that the device is requesting access to the external packet data networks. The Gn or Gp interface circuitry 701, 703 may also then determine that the device is one of a plurality of associated devices, through communication with the SGSN. The Gi interface circuitry 702 may then apply the policy, by preventing or limiting the access to the external packet data network in the event that the policy is violated.

Figure 16:
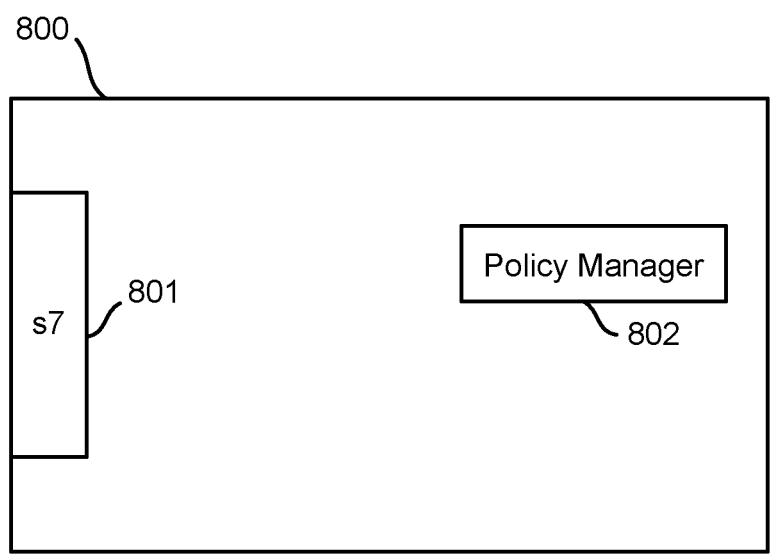
FIG. 16 shows a policy control and charging rules function (PCRF) according to an embodiment of the present invention.

FIG. 16 shows a policy control and charging rules function (PCRF) 800 according to one aspect of the present invention.

The PCRF 800 comprises s7 interface circuitry 801, for sending messages to and receiving messages from PDN GWs. The PCRF 800 further comprises a policy manager 802, in communication with the s7 interface circuitry 801.

In operation, the s7 interface circuitry 801 communicates with a PDN GW, and so determines that a device has connected to the network, in that the device is requesting access to the external packet data networks. The policy manager 802 may then determine that the device is one of a plurality of associated devices (e.g. if the information regarding the associated devices is stored in a database in the policy manager 802). The policy manager 802 may then apply the policy through communication with the PDN GW via the s7 interface circuitry 801, by preventing or limiting the access to the external packet data network in the event that the policy is violated. The s7 interface circuitry 801 may also communicate with a SGW, signalling information that the device is one of a plurality of associated devices.

The present invention therefore provides methods and apparatus for applying policy to a plurality of associated devices, e.g. devices belonging to a common user. The policies are such that abuse of charging systems is hindered, or prevented altogether, by limiting or preventing the network access of one or more of the associated devices in the event that the policies are violated. For example, the policies may be based on ensuring the associated devices are close to each other geographically, or based on the network use of the devices (e.g. bitrates, aggregate download data, etc). Such methods and apparatus allow operators to offer desirable charging schemes to users of multiple devices, without those schemes being abused.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, in a wireless telecommunication network, comprising:
   determining that a first user equipment device and a second user equipment device have connected to the network, the first user equipment device and the second user equipment device being first and second user equipment devices of a plurality of user equipment devices associated with a common user;
   in response thereto, controlling network access of the first user equipment device according to a policy defined for the plurality of user equipment devices, the controlling network access comprising controlling the network access of the first user equipment device according to the distance between the first user equipment device and the second user equipment device of the plurality of user equipment devices;
   wherein the controlling network access comprises applying an upper limit to the aggregate bitrate of the first and second user equipment devices.

2. The method of claim 1 wherein the controlling network access comprises limiting or preventing the network access of the first user equipment device in response to determining that the first user equipment device is more than a threshold distance from the second user equipment device.

3. The method of claim 1:
   wherein the first user equipment device has a first location identifier;
   wherein the second user equipment device has a second location identifier;
   further comprising comparing the first and second location identifiers.

4. The method of claim 3 wherein the respective location identifiers include one or more of:
   a cell ID of a cell the corresponding user equipment device is connected to;
   a sector ID of a cell the corresponding user equipment device is connected to;
   a base station ID of a base station the corresponding user equipment device is connected to;
   a service area ID of a service area the corresponding user equipment device is connected to;
   a tracking area ID of a tracking area the corresponding user equipment device is connected to;
   a routing area ID of a routing area the corresponding user equipment device is connected to;
   GPS co-ordinates of the corresponding user equipment device.

5. The method of claim 1 further comprising:
   sending a code to the second user equipment device;
   attempting to receive a message from the first user equipment device, the message being a function of the code;
   controlling network access of the first user equipment device according to whether or not the message is correctly received.

6. The method of claim 1 wherein the controlling network access comprises allowing a subset of the plurality of associated devices to use a particular service at a time.

7. The method of claim 1:
   wherein the first user equipment device has a first identity;

wherein the determining comprises accessing a database, the database comprising an entry with the respective identities of each user equipment device of the plurality of user equipment devices.

8. The method of claim 1 further comprising receiving information from the first user equipment device identifying the other user equipment devices of the plurality of user equipment devices.

9. An a wireless telecommunication network, comprising:
interface circuitry configured to determine that a first user equipment device and a second user equipment device have connected to the network, the first user equipment device and the second user equipment device being first and second user equipment devices of a plurality of user equipment devices associated with a common user;
a controller configured to control the network access of the first user equipment device according to a policy defined for the plurality of user equipment devices, the control based on the distance between the first user equipment device and the second user equipment device of the plurality of user equipment devices;
wherein the controller is configured to control the network access of the first user device by applying an upper limit to at least one of:
an aggregate bitrate of the first and second user equipment devices;
an aggregate data usage of the plurality of user equipment devices in a period of time.

10. The apparatus of claim 9 wherein the interface circuitry is further configured to signal to a remote network node that the first user equipment device is one of a plurality of user equipment devices associated with a common user.

11. The apparatus of claim 9 wherein the apparatus is located in one or more of:
a mobility management entity;
a serving GPRS support node;
a GPRS gateway support node;
a packet data network gateway;
a policy control and charging rules function.

12. A method, in a wireless telecommunication network, comprising:
determining that a first user equipment device and a second user equipment device have connected to the network, the first user equipment device and the second user equipment device being first and second user equipment devices of a plurality of user equipment devices associated with a common user;
in response thereto, controlling network access of the first user equipment device according to a policy defined for the plurality of user equipment devices, the controlling network access comprising controlling the network access of the first user equipment device according to the distance between the first user equipment device and the second user equipment device of the plurality of user equipment devices;
wherein the controlling network access comprises applying an upper limit to the aggregate data usage of the plurality of user equipment devices in a period of time.

13. The method of claim 12 wherein the controlling network access comprises limiting or preventing the network access of the first user equipment device in response to determining that the first user equipment device is more than a threshold distance from the second user equipment device.

14. The method of claim 12:
wherein the first user equipment device has a first location identifier;
wherein the second user equipment device has a second location identifier;
further comprising comparing the first and second location identifiers.

15. The method of claim 14 wherein the respective location identifiers include one or more of:
a cell ID of a cell the corresponding user equipment device is connected to;
a sector ID of a cell the corresponding user equipment device is connected to;
a base station ID of a base station the corresponding user equipment device is connected to;
a service area ID of a service area the corresponding user equipment device is connected to;
a tracking area ID of a tracking area the corresponding user equipment device is connected to;
a routing area ID of a routing area the corresponding user equipment device is connected to;
GPS co-ordinates of the corresponding user equipment device.

16. The method of claim 12 further comprising:
sending a code to the second user equipment device;
attempting to receive a message from the first user equipment device, the message being a function of the code;
controlling network access of the first user equipment device according to whether or not the message is correctly received.

17. The method of claim 12 wherein the controlling network access comprises allowing a subset of the plurality of associated devices to use a particular service at a time.

18. The method of claim 12:
wherein the first user equipment device has a first identity;
wherein the determining comprises accessing a database, the database comprising an entry with the respective identities of each user equipment device of the plurality of user equipment devices.

19. The method of claim 12 further comprising receiving information from the first user equipment device identifying the other user equipment devices of the plurality of user equipment devices.

20. The method of claim 12 further comprising:
determining one or more network nodes serving the second user equipment device;
assigning the one or more network nodes to the first user equipment device.

* * * * *

UNITED STATES PATENT AND TRADEMARK OFFICE
CERTIFICATE OF CORRECTION

| | | |
|---|---|---|
| PATENT NO. | : 8,688,115 B2 | Page 1 of 1 |
| APPLICATION NO. | : 13/510444 | |
| DATED | : April 1, 2014 | |
| INVENTOR(S) | : Mildh et al. | |

It is certified that error appears in the above-identified patent and that said Letters Patent is hereby corrected as shown below:

On the title page, item (57), under "ABSTRACT", in Column 2, Line 3, delete "the same user" and insert -- the same user. --, therefor.

In the Specification

In Column 5, Line 57, delete "PDN GW 37" and insert -- PDN GW 31 --, therefor.

In the Claims

In Column 17, Line 9, in Claim 9, delete "An a" and insert -- A --, therefor.

Signed and Sealed this
Second Day of September, 2014

Michelle K. Lee
*Deputy Director of the United States Patent and Trademark Office*